Figure 1:
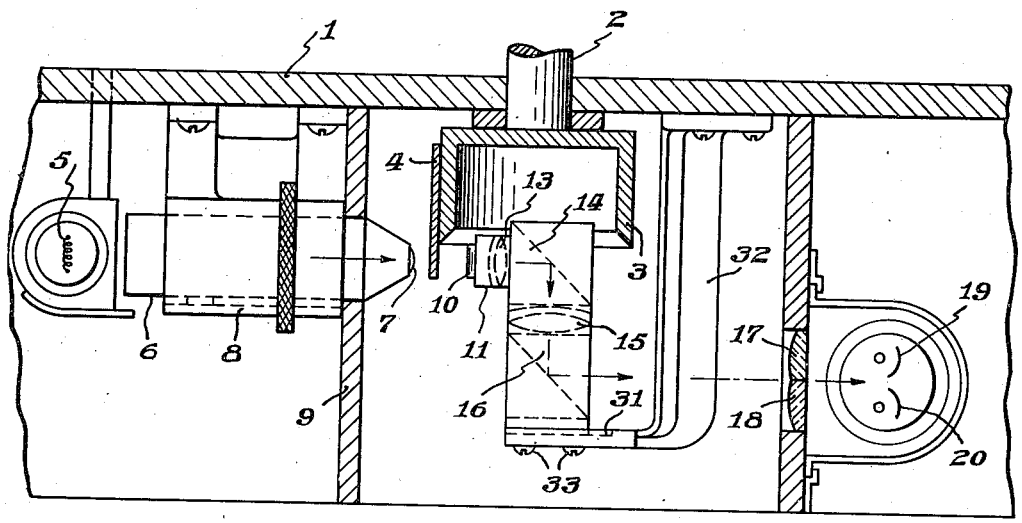

Oct. 31, 1939.   L. T. SACHTLEBEN   2,178,244
OPTICAL SYSTEM FOR SOUND REPRODUCERS
Filed Jan. 30, 1937   2 Sheets-Sheet 1

Inventor
Lawrence T. Sachtleben
By
Attorney

Oct. 31, 1939.   L. T. SACHTLEBEN   2,178,244
OPTICAL SYSTEM FOR SOUND REPRODUCERS
Filed Jan. 30, 1937   2 Sheets-Sheet 2
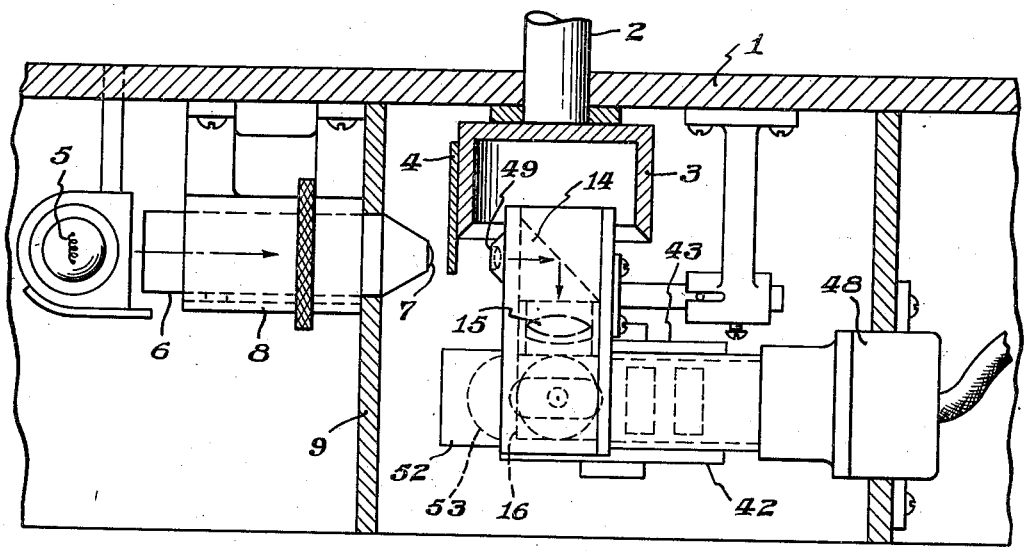
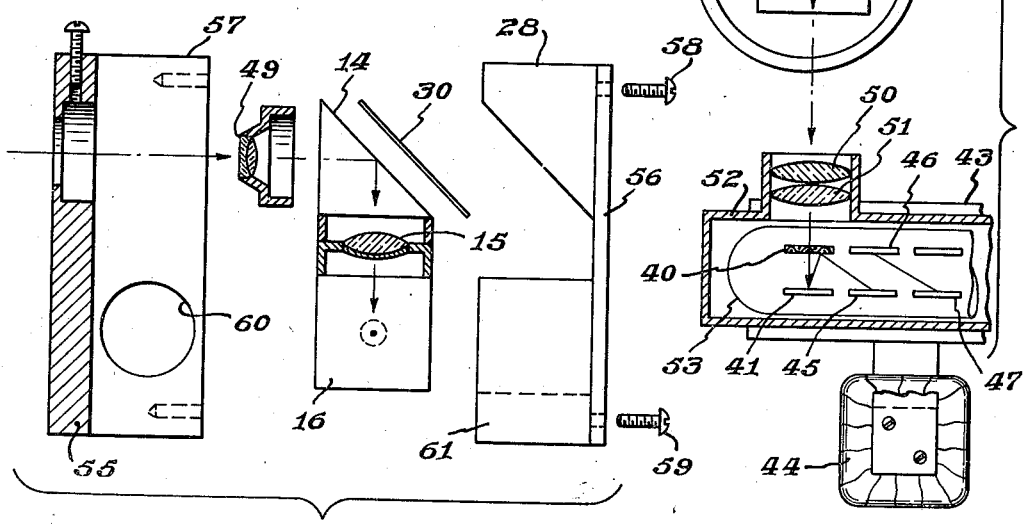
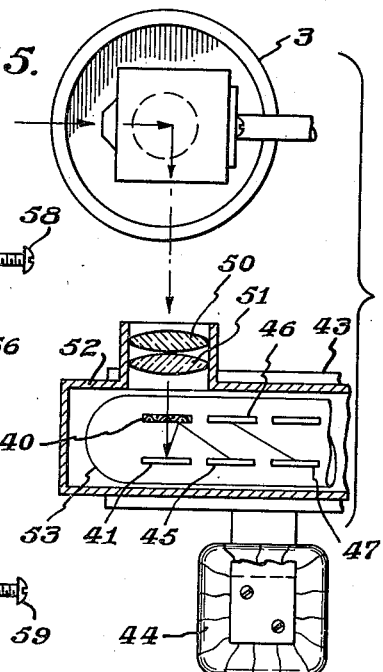
Inventor
Lawrence T. Sachtleben
By
Attorney Patented Oct. 31, 1939

2,178,244

UNITED STATES PATENT OFFICE 2,178,244

OPTICAL SYSTEM FOR SOUND REPRODUCERS

Lawrence T. Sachtleben, Camden, N. J., assignor to Radio Corporation of America, a corporation of Delaware Application January 30, 1937, Serial No. 123,208

5 Claims. (Cl. 179—100.3)

This invention relates to a new and useful improvement in optical systems for sound reproducers. More particularly, it relates to an improved optical system for picking up the beam of light transmitted by a sound record film and directing it to an appropriate photoelectric device.

In recent years there has gone into extensive use a form of sound reproducing device wherein a film sound record is used and wherein the sound record portion of the film overhangs one end of a rotatable drum which supports the film at the reproduction point. Such arrangements are described and claimed, for example, in Cawley Patent No. 1,825,438 and in Loomis and Reynolds Patent No. 2,019,147, which latter illustrates a commercial form of the device. In the commercial construction of these devices it is impractical to support the photocell adjacent to the sound track and within the film drum, as such an arrangement of parts renders the apparatus bulky, cumbersome and difficult to thread with film. There have, accordingly, been proposed a number of ways to locate the photocell outside of the film drum and to direct light thereto by an appropriate optical system. One form of such apparatus applicable to single modulated sound track is shown in the aforesaid Loomis and Reynolds patent. Another form of apparatus applicable to a push-pull sound record is shown in the Dimmick application, Serial No. 92,479, filed July 25, 1936, entitled "Push-pull optical system."

In accordance with the present invention, there is provided a somewhat different and simplified optical system, which is applicable to the use of either single or push-pull sound track and is also applicable to the type of photoelectric device ordinarily referred to as an "electron multipler" which is considerably more bulky and cumbersome than the conventional two-element photocell used in the prior art, such, for example, as the RCA Cunningham type UX–864 photocell.

In accordance with my invention, I provide what may be termed a periscopic optical system adapted to fit within the film drum and having the lenses thereof partly between the film and the reflecting prism, partly between that prism and a second prism, and partly between the second prism and the protoelectric device.

One object of my invention is to provide a simplified and compact optical system.

Another object of my invention is to provide an optical system capable of rigid mounting.

Another object of my invention is to provide an optical system which may be readily converted from a type useful with a single or push-pull photocell to a type useful with an electron multiplier.

Another object of my invention is to provide an improved mounting for an optical system.

Another object of my invention is to provide an optical system which will produce a spot of light on the photosensitive electrode of a photoelectric device which varies in intensity while maintaining its position and area constant when the light beam is modulated by a variable area sound record.

Figure 2:
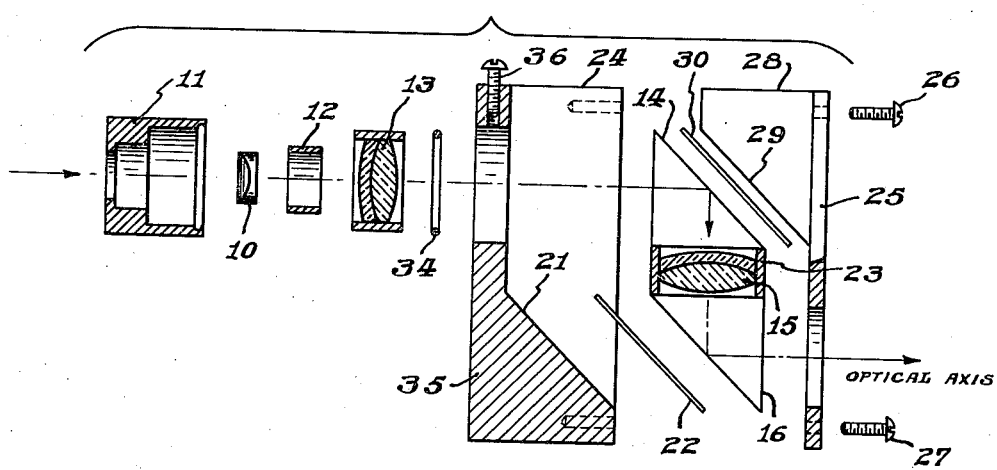

Other and incidental objects of my invention will be apparent to those skilled in the art from a reading of the following specification and an inspection of the accompanying drawings in which Figure 1 is a top view of my optical system as applied to a push-pull sound head, Figure 2 is an exploded view of the main unit of my optical system as shown in Fig. 1, Figure 3 is a top view of a modified form of optical system as applied to a sound head using an electron multiplier, Figure 4 is an exploded view of the main unit of the optical system shown in Fig. 3, and Figure 5 is a side view of the portion of the optical system shown in Fig. 3 which is pertinent to my invention.

In the drawings, identical parts are referred to by the same reference numeral in both species of the invention.

In a sound head constructed as shown and described in the aforesaid Loomis and Reynolds patent, a center plate 1 is provided which serves as the main support for the various elements of the sound head. In this center plate there is appropriately journaled a shaft 2 which carries on one end a drum 3 adapted to support a sound film 4 at the reproduction point. An exciter lamp 5 is provided, light from which passes into an optical system 6 and is directed by the objective 7 thereof upon the film 4 in the form of a fine line. This optical system is adjustably supported in an appropriate bracket 8, in which it is longitudinally movable for focusing. Stray light from the exciter lamp 5 is prevented from passing to the other portions of the sound head by means of the partition 9.

After the light from the aforesaid optical system has passed through the sound track on the film 4 it emerges in the form of a diverging beam, which it is necessary to collect upon the appropriate electrode or electrodes of a photosensitive device. The photosensitive devices in use at the present time usually involve a cathode coated with an appropriate photosensitive material, such, for example, as caesium or a compound thereof, which emits electrons in proportion to the light falling thereupon.

Due to uneven distribution of the light sensitive material, the said cathode is not uniformly sensitive to light in various portions of its area and it is, accordingly, desirable that the position or size of the light spot shall not shift upon the cathode, but shall only vary in intensity. In order to accomplish this, it is necessary that an optical system be provided which picks up this beam of light of constant intensity and varying area and converts it into a beam of constant area and varying intensity. In a push-pull sound record, such, for example, as that shown in Dimmick application Serial No. 610,302, filed May 9, 1932, entitled "Sound recording and reproducing apparatus", it is necessary that light from each half of the sound track be directed to the appropriate photocell cathode and that each of these half-beams be correspondingly converted from a constant intensity variable area beam to a constant area variable intensity beam, and the form of my invention shown in Figs. 1 and 2 is directed to this species of the invention.

In this form of the invention a cylindrical lens 10 is provided which is located within an appropriate mount 11. This lens is held in the mount by means of an appropriate bushing 12 and to the rear thereof is located an achromatic spherical lens 13 which is held in place in the mount 11 by means of a snap ring 34. This mount 11 is secured within a body member 35 by means of an appropriate set screw 36, which permits the proper orientation of the lens 10 and the proper axial position of the lens 13.

This body member 35 is one of the important features of my invention, as it serves to hold the more important elements of the optical system in fixed position relative to each other and it also provides means by which these elements may be mounted rigidly in relation to the body of the sound head.

When the light emerges from the lens 13, it strikes the right angled prism 14, which bends the beam 90° and directs it axially out of the film drum 3. After leaving the prism 14, the beam passes through the lens 15 and strikes the second reflecting prism 16, which again bends the beam at right angles and directs it to the double lens 17, 18, which focuses the appropriate halves of the beams on the corresponding photocell cathodes 19 and 20.

The prism 16 rests upon an appropriately shaped and machined face 21 of the member 35 and is spaced therefrom by a paper spacer 22, which permits it to be firmly clamped thereagainst. The lens 15 is mounted within an appropriate cell 23 which is made of such length that it can rest firmly against the entrance face of the prism 16, while the prism 14 rests against the opposite end of the cell 23.

As shown at 24, the body member 35 is provided with two sides which give it the form of a box open on one side and one end. A cover 25 fits over the open side of the box and is provided with an appropriate aperture for the emergent light beam, this cover being secured to the member 35 by appropriate screws 26 and 27. The cover is provided with an extension 28, which fits between the sides 24 of the member 35 and closes the end of the box structure. This extension 28 is provided with an appropriate inclined face 29 which is parallel with the face 21 and is adapted to seat firmly against the hypotenuse of the prism 14 spaced therefrom by an appropriate spacer 30 corresponding to the spacer 22. When the prisms 14 and 16 and the lens cell 23 are placed in the member 35 and the cover 25 is screwed thereon, the member 28 forces the prism 14 firmly against the cell 23 and the prism 16 firmly against the face 21, thereby preventing any relative movement whatsoever of these parts and maintaining them accurately in adjustment. The member 35 is adapted to fit in an appropriate keyway 31 in the bracket 32, being secured in an adjusted position therein by the screws 33, which are movable in slots in the member 32. The entire unit contained in the body member 35 may therefore be moved along the optical axis of the optical system 6 for focusing.

The focal lengths of the lenses are chosen as follows: The lens 13 and the lens 15 function as a single lens and, in the plane of Fig. 1, focus an image of the sound track of the film 4 on the two cylindrical lenses 17 and 18, an image of one half the track being formed on each of these lenses and considerably enlarged, as, for example, in the ratio of 10:1. If the image of the sound record in the perpendicular direction were similarly focused, it would fall on the cathodes 19 and 20 of the photocell in the form of separate spots of light of uniform brightness and of varying size. The cylindrical lens 10, however, which has its axis in the plane of the paper in Fig. 1, causes the image in the perpendicular plane to fall much closer to the prism 16 than the lenses 17 and 18, and from this image plane the light diverges to the cathodes 19 and 20. Since in this perpendicular plane there is no sharp focus at the cathodes, a spot of light of uniform size and varying intensity is formed on each cathode.

Due to the arrangement of lenses just described the sound track on the film 4 is located at an aperture stop of the optical system in relation to the light directed on the cathodes 19 and 20 of the photocell. Due to this location of the film in relation to the image the individual sound wave images do not affect the size of the images on the photocell but only their brightness just as variation in the diaphragm adjustment of a camera affects the brightness of the image on the film without affecting its area.

Referring now to the form of the invention shown in Figs. 3, 4 and 5. A type of photoelectric device has recently come into use known as an "electron multiplier." This type of device is shown and described in detail in U. S. patent to Slepian No. 1,450,265 and U. S. application Serial No. 48,982, filed by V. K. Zworykin on October 30, 1935, entitled "Electric discharge devices."

Referring first to Fig. 5, this electron multiplier may be preferably described as follows: Light passing in the direction of the arrow through a gauze or other electrically conducting, optically transparent electrode 40 strikes the electrode 41. This electrode 41 is coated with an appropriately light responsive material, such as caesium, which thereupon emits electrons in the general direction of the corresponding anode 40. The entire device is located in an electromagnetic field between the pole pieces 42 and 43 which are energized by the winding 44. This magnetic field causes the electrons emitted from the electrode 41 to describe a curved path and strike the anode 45, which is electrically connected to the anode 40. This anode 45 is coated with active material like the electrode 41 and on the impact of electrons from the electrode 41, the electrode 45 emits electrons, but in greater quantity than they were emitted from the electrode 41. This electrode 45, although serving as an anode in relation to the electrode 41, is so connected to a source of potential that it serves as a cathode in relation to the electrodes 46 and 47, and the electrons emitted from the electrode 45 therefore are emitted toward electrode 46, travel in a curved path caused by the magnetic field in the same manner as the electrodes leaving the cathode 41 and impinge upon the anode 47, which, in turn, emits electrons more copiously and from which these electrons may be directed onward to other electrodes in like manner. Due to this increased emission of electrons at each successive electrode a very high voltage gain may be secured as compared to the voltage which would be produced were the emission of electrons from the electrode 41 alone and the output of the device is correspondingly capable of giving a much greater output than an ordinary photocell. In some instances the output of the electron multiplier may be sufficient to operate the desired reproducing means directly, without the interposition of any other amplifier.

In the optical system of this form of the invention it is necessary to direct the beam of variable light to an appropriate location for the electron multiplier tube which is necessarily considerably larger than an ordinary photocell, and in order to do this, use an arrangement of lenses and prisms very similar to that shown in Figs. 1 and 2. The exciter lamp and illuminating optical system are identical with those shown in Fig. 1, as is the film supporting means. The electron multiplier is supported on an appropriate socket 48 mounted in the lower portion of the sound head, as shown in Fig. 5, and it is necessary that the optical system carry the light out from within the drum 3 and direct it downwardly upon the photosensitive cathode of the tube. The optical system used to accomplish this differs from that used in Fig. 1 in that the prism 16 is rotated 90° about the optical axis of the lens 15 so as to reflect the light downwardly instead of horizontally. The light passing through the film 4 enters the lens 49, which is a corrected spherical lens, is reflected by the prism 14 as before into the lens 15, and then passes to the prism 16. This prism 16, as shown in Fig. 5, directs the light downwardly to the lenses 50 and 51 in the casing 52 of the electron multiplier tube 53. The objective 49 with its mount fits into the base member 55, which is quite similar to the member 15 shown in Fig. 2, except that it is open on one side and both ends. The cover 56 fits over the top of the sides 57 of the member 55 and is secured thereto by the screws 58 and 59. The cover 56 is provided with a projection 28 similar to that provided on the cover 25 in Fig. 2 and this projection 28 holds the prism 14 firmly against the base member 55 with a paper spacer 30 interposed between 14 and 28. The prism 16, which is turned at right angles to the position shown in Fig. 2, fits down over the hole 60 in the member 55 and is held firmly thereagainst by the projection 61, which is made integral with the cover 56. This projection 61 has the same shape as the projection 28 but turned end for end and rotated 90° in order to cooperate with the hypotenuse of the right angle prism 16. It will be apparent that when these units are assembled and the cover 56 is screwed on the base member 55 the projections 28 and 61 will hold the prisms 14 and 16 and the lens 15 rigidly in position.

In this optical system no cylindrical means 10 is used, as in Fig. 2, as this particular form of the invention is intended to operate with single sound track and with an electron multiplier having only a single photoelectric electrode. The spherical lens 49 and the lens 15 therefor are chosen of such focal length as to cooperate in the same manner as the lenses 13 and 15 of Fig. 1 and to focus an image of the sound track upon the entrance pupil of the lens system 50, 51 consisting of spherical lenses. These lenses 50 and 51, in turn, focus as image of the entrance pupil of the system, i. e., the lens 49 upon the cathode 41. Since no sharp image of the illuminated area of the film is formed upon the cathode 41, and since the film is located at an aperture stop of the system so that it does not affect the size but only the brightness of this illuminated area, the spot of light does not vary in size but since the image of the aperture of the lens 49 is focused on this electrode, a spot of light is produced which varies in intensity in accordance with the transparent area of the film.

Having now described my invention, I claim:

1. An optical system for directing a beam of light onto a photosensitive device comprising lens means adapted to direct a beam of light to a photoelectrically sensitive device and additional lens means in cooperative relation with the first lens means for distributing said beam of light over the light responsive portion of said photoelectrically sensitive device in the form on a spot of light of uniform size and varying intensity irrespective of whether the beam at the first lens was of unvarying size.

2. An optical system of the class described comprising an objective lens consisting of two spaced portions, a reflecting prism between said portions, and a second reflecting prism adjacent the second of said portions, said lens and prisms being so disposed with respect to one another that a beam of light is distributed in the form of a spot of light of uniform size and varying intensity irrespective of whether the beam in the first lens was of unvarying size.

3. An optical system for directing a beam of light onto a photosensitive device comprising an objective lens consisting of two spaced portions, a reflecting prism between said portions, a second reflecting prism adjacent the second of said portions whereby the beam of light is laterally displaced in passing through said objective lens and prisms, and additional lens means for directing the emergent beam of light to said photosensitive device.

4. An optical system of the class described comprising a base member, a lens mounted in said base member, a reflecting prism mounted in said base member in cooperative relation with said lens, a second lens mounted adjacent another face of said reflecting prism and adapted to cooperate with said first lens as a single compound lens, a second reflecting prism mounted in cooperative relation to said second lens, and a cap member adapted to cooperate with said base and to hold said prisms and said second lens in predetermined fixed relation.

5. An optical system of the class described adapted to focus a beam of light from a push-pull record upon a double cathode photocell, comprising a pair of cylindrical lenses adjacent said photocell, an objective lens adapted to focus an image of the sound track in a direction transverse to the direction of movement of the sound track upon said cylindrical lenses, and a cylindrical lens adjacent said objective having its axis transverse to the direction of movement of the sound track and adapted to cooperate with the objective lens to focus an image of the sound track in the longitudinal direction between said objective and said cylindrical lenses.

LAWRENCE T. SACHTLEBEN.